US010322430B2

(12) United States Patent
Miller (10) Patent No.: US 10,322,430 B2
(45) Date of Patent: Jun. 18, 2019

(54) FLEXIBLE ARTICULATING PAINTING STAND FOR VEHICLE BUMPERS

(71) Applicant: Harold Dean Miller, Fayetteville, AR (US)

(72) Inventor: Harold Dean Miller, Fayetteville, AR (US)

(73) Assignee: Harold Dean Miller, Fayetteville, AR (US)

( * ) Notice: Subject to any disclaimer, the term of this patent is extended or adjusted under 35 U.S.C. 154(b) by 104 days.

(21) Appl. No.: 15/350,102

(22) Filed: Nov. 13, 2016

(65) Prior Publication Data

US 2018/0133737 A1    May 17, 2018

(51) Int. Cl.

| B05B 13/02 | (2006.01) |
|---|---|
| F16M 11/28 | (2006.01) |
| F16M 11/42 | (2006.01) |
| F16M 11/18 | (2006.01) |
| F16M 11/10 | (2006.01) |

(52) U.S. Cl.
CPC ...... *B05B 13/0235* (2013.01); *B05B 13/0271* (2013.01); *F16M 11/10* (2013.01); *F16M 11/18* (2013.01); *F16M 11/28* (2013.01); *F16M 11/42* (2013.01); *F16M 2200/028* (2013.01); *F16M 2200/041* (2013.01)

(58) Field of Classification Search
None
See application file for complete search history.

(56) References Cited

U.S. PATENT DOCUMENTS

| 5,169,683 A * | 12/1992 | Matsui | B05B 13/0221 |
| | | | 118/56 |
| 6,409,128 B1 * | 6/2002 | Deshler | B05B 13/0285 |
| | | | 248/125.1 |
| 7,445,184 B1 | 11/2008 | Johnson | |
| 7,448,606 B1 | 11/2008 | Johnson | |
| 8,328,173 B1 * | 12/2012 | DesForge | B25H 1/0007 |
| | | | 248/176.1 |
| 9,016,664 B1 | 4/2015 | Powers | |
| 9,469,016 B2 | 10/2016 | Cahill | |
| 2004/0074405 A1 * | 4/2004 | Oleson | B05C 17/06 |
| | | | 101/127.1 |
| 2004/0083846 A1 * | 5/2004 | Sundaresan | G05G 1/405 |
| | | | 74/512 |

* cited by examiner

*Primary Examiner* — Nathan T Leong
(74) *Attorney, Agent, or Firm* — Mark N. Scalise; Michael F. Scalise (57) ABSTRACT

A painting stand for vehicle bumpers includes a base frame supported by a plurality of casters together with a vertically supported post. A post extension is telescopically supported within the vertical post and is adjustable in its elevation. The upper end of the post extension is coupled to a support, to which is coupled a pivoting support rack. The support rack is comprised of upper and lower transverse/horizontal member(s). These transverse members are rigid in the middle and semi-rigid at both ends and serve as a mounting surface to which bumpers in need of paint or repair are affixed. The support rack's unique configuration allows the operator to easily affix and detach a wide variety of bumper shapes and sizes to the stand quickly and efficiently. Said support rack pivots. The pivoting function of the support rack is actuated and controlled by a foot pedal connected to the support rack by a cable.

12 Claims, 7 Drawing Sheets

FLEXIBLE ARTICULATING PAINTING STAND FOR VEHICLE BUMPERS

BACKGROUND OF THE INVENTION

1. Field of the Invention

This invention relates generally to painting apparatus and processes for applying high quality automotive type paints to vehicle bumpers including cars, trucks, vans or the like. This invention relates more particularly to devices known generally as painting stands for use in supporting articles of body work or the like during the paint application process.

2. Prior Art

In many facilities engaged in activities such as auto body repair, auto restoration, truck body repair, and auto or van customizing, a need arises to paint some or all of the automobile, truck or van body parts. In most cases in which a high quality paint finish is desired, the need arises to separate the plurality of body components and accessory items such as fenders, bumpers, hood, trunk, trim pieces and fuel access door covers for the painting process. This disassembly of component body parts and accessories is undertaken to ensure that a high quality paint finish will be applied to major panel surfaces and to the surrounding edges of each body component. The painted pieces and components are then reassembled onto the vehicle resulting in a high quality paint job.

The paints utilized in such automotive and other vehicle painting processes are highly specialized paints formulated to provide an extremely high gloss smooth even finish free of defects and exhibiting great luster. As a result, the painting process must be undertaken with great skill and care to avoid defects such as runs or overspray which are exaggerated on such high luster paint applications.

In a typical painting facility of the type used in automotive truck and van body painting, a separate painting area usually enclosed and often referred to as a spray booth is provided. The enclosure of the spray booth helps to control the painting environment and provide the necessary lighting and ventilation for the painting application. In addition, the filtering systems operating on the spray booth minimize the amount of dust or other airborne particles within the environment. In addition, one or more air-driven spray guns each coupled to a supply of compressed air by long flexible hoses are operated to apply the paint itself.

The art of spraying such high gloss mirror-like finishes on the often multiply curved multiply faceted components typical of vehicle body parts is a matter of great training and skill. A major factor in achieving such skillful paint spraying is the provision of proper lighting together with the ability to easily move and reorient the articles being painted. A skilled spray painter watches the light reflected off an article as the paint is sprayed thereon to gage application of the paint. Preferably, the article being sprayed is movable to be viewed at a critical angle which allows the spray painter to observe reflection off the accumulating paint. The paint spraying activity is a demanding activity in which mistakes and mishaps can be extremely costly to rectify. One of the more critical elements in this demanding environment of the spray booth is the painting stand used to hold the article or articles being painting. Ideally, the paint stand supports the article or articles being painted in a manner which avoids entanglement with the plurality of compressed air hoses operating the spray gun or spray guns as the painter moves about while providing easy preferably one-handed manipulation of the supported part by the painter.

Faced with the critical need for aiding spray painters in painting such body parts or articles, practitioners in the art have provided a virtually endless variety of paint stands known under different brand and product names. Some of these devices are highly specialized being specifically designed for a single type of article such as bumpers or the like. Others, however, are more generally fabricated for use on a variety of articles and are little more than supporting racks having a plurality of hooks extending therefrom for hanging parts during painting.

One such typical painting stand is manufactured by Time Shaver Tools in Orange, Calif. under the product name Bumper Thing Stand which provides a set of angularly disposed wings coupled to a pivotal support and supported by a center post on a rolling base.

Another typical painting stand is manufactured by Brut Manufacturing Company in Navarre, Ohio under the product name Deluxe Bump-Bench which provides a plurality of converging upwardly extending U-shaped elements supported by a center post on a rolling base. A tilt handle secured to the base is provided for portability.

Other similar devices manufactured by KNO:GREEF MANUFACTURING in Edmonton, AB Canada under the product Ultimate Auto Body Parts Stand provides a combination stand for a variety of parts having a T-shaped base and an extending center post which vertically supports a multiply articulated arm set for receiving and securing the to-be-painted articles.

Examples of more generally used rack-like devices are provided by DAR-A-CON Industries, Inc. in Monett, Mo. under various product names such as Tilt Table and Portable Scissors Table.

A typical paint stand of highly specialized use for supporting vehicle bumpers is manufactured by Steck Manufacturing Company under the product name Bumper Tree which provides a paint stand having a fixed X-shaped base supporting a vertical post upon which a similar X-shaped member is supported for receiving bumpers or similar articles.

While the prior art devices such as those described and identified above have provided some improvement in the art and enjoyed in some instances commercial success, they are generally limited in their functionality and are, for the most part, subject to several faults.

For example, color match. When painting bumpers, of paramount importance to a spray painter is to ensure that there is color match with the rest of the car and it helps the practitioner to achieve this result by being able to paint the bumpers in the same position as they are on the car. It is known to those accomplished in the spray painting profession that gravity has an effect on some colors as it dries from a liquid to a solid form.

By utilizing the articulating function of this current invention, the spray painter is able to easily and efficiently position the bumper in whatever orientation they wish by the simple act of depressing the foot pedal.

Bumpers come in many shapes and sizes, and there exists a great need for a painting stand that will accommodate most, if not all types, sizes and shapes of bumpers. Prior art bumper stands currently in use which are billed as "adjustable" require the spray painter to make a lot of adjustments with sliding parts, which become clogged with paint overspray and over time become next to impossible to move or adjust, and which require constant maintenance and cleaning.

The present invention is flexible and has no sliding parts to adjust. Instead, the flexible mounting bracket conforms to the shape of the bumper and nests on the inside of the bumper for easy mounting. By utilizing the flexible mounting bracket of this invention, and two zip ties, a spray painter can have a bumper mounted, fastened and ready to paint in literally seconds with no adjustments necessary. The value and advantages that come with the ability to easily and quickly affix most any bumper to a painting stand without the necessity to make a lot of adjustments, and which eliminates the need for maintenance and cleaning of the painting stand is readily apparent to those accomplished in the art of spray painting bumpers.

Workers compensation claims are a reality of the world we currently work and live in. The ability of a spray painter to be able to access all bumper surfaces and openings and edges and any difficult bumper areas without requiring him or her to kneel, bend, twist or contort their body into uncomfortable or inaccessible positions greatly eliminates the risk of muscle strains and sprains or bodily injury associated with performing such gyrations, especially by any spray painters who may not be in optimum physical shape to do so.

This present invention quickly and efficiently solves those problems by allowing the bumper to rotate with the simple push of a foot pedal. By pushing the foot pedal of this invention and causing the bumper to rotate, the spray painter has full and easy access to bottom edges, openings, and other difficult to reach areas. Not only does this eliminate most all of any need of the spray painter to bend, squat, twist or contort their body to complete the job, it also allows for an improvement in the job satisfaction of the spray painter and the overall quality of the paint finish, as the spray painter is always in a proper upright and relaxed posture, allowing them the ability to perform their best work without fatigue.

Adjusting and changing the position of a bumper during the spray painting operation while using prior art bumper stands always runs the risk of accidently touching or brushing a wet painted bumper surface or contamination of the spray painters hands or gloves by touching a part of the painting stand (knobs, levers and latches) that are wet with paint from overspray. Now the spray painter is getting wet paint on his spray gun and anything else he touches, possibly setting off a domino effect of contaminating a variety of items, surfaces and clothing with wet paint and generally making an unnecessary mess of everything touched. Even if the surface touched is not wet, the spray painter still runs the considerable risk of having dried paint stick to their hand or glove and then sprinkle off the hand or glove onto the freshly painted bumper surface while the spray painter is working, causing undesirable paint finish results.

This invention resolves all of these problems by allowing the rotation and adjustment of the bumper being painted without the spray painter using his hands, or touching anything other than a foot pedal with his or her foot. The spray painters hands remain clean and free of wet paint or dry paint dust, and the chance of accidently touching, brushing or contaminating the freshly painted bumper surface and ruining the fresh paint job is greatly reduced.

Lastly, prior art devices often fail to provide a solution to the vexing problem of involvement or entanglement with the compressed air hoses utilized in supplying compressed air to the paint sprayers within the booth. When using prior art devices this problem is major in its impact in that a typical spray painter often becomes fully involved in paint application and spray gun manipulation moving about the bumper being painted to access all surfaces, openings, edges and difficult areas, and fails to prevent the entanglement of such hoses. One unfortunate tug on an entangled hose which tips over a paint stand having articles thereon can erase much of the profit anticipated in the painting activity.

The present invention resolves that issue, again by allowing the spray painter full and easy access to bottom edges, openings, and other difficult to reach areas with the simple push on a foot pedal, causing the bumper workpiece to rotate in place and provide the spray painter with ready easy access to all bumper surfaces while remaining in a stationary location.

Thus, in the case of currently available prior art bumper painting stands, there remains an unresolved and unfulfilled need in the art for a more efficient, cost effective, versatile and useful bumper painting stand. That need is met and fulfilled by the present invention.

SUMMARY OF THE INVENTION

Accordingly, it is a general object of the present invention to provide an improved painting stand for bumper parts. It is a more particular object of the present invention to provide an improved painting stand for vehicle bumpers which is extremely versatile and effective in supporting a plurality of differently shaped bumpers in a variety of orientations.

In accordance with the present invention, there is provided a painting stand for supporting vehicle bumper parts for spray painting, the painting stand comprising: a base having a base frame and a plurality of casters for rollingly supporting the base; a vertical post ("Mast Assembly") supported by the base frame and extending upwardly therefrom; a post extension slidably supported by the vertical post and having an upper end; height adjustment means for securing the post extension to the vertical post at a selected height; a bumper mounting fixture comprised of an upper and lower transverse/horizontal members, said members being approximately ½ to ¾ inch in diameter, which are both horizontally rigid in the middle and semi-rigid at the outer portion of each end (hereinafter referred to as the "support rack". The support rack serves as a bumper mounting fixture. The flexible ends of the support rack allow the operator to easily affix a wide variety of bumper shapes and sizes to the stand quickly and efficiently, via any tying mechanism such as zip ties, straps, string or rope, greatly reducing the time, and increasing the ease of affixing to, and detaching from the stand, any size, shape or model bumper.

Said support rack is affixed to the Mast Assembly via a U-shaped horizontal bracket Which serves as a pivoting support mechanism which allows the support rack and the attached bumper to pivot or "roll" 180 degrees along the x axis in order to easily access all surfaces of the bumper from one station, eliminating the need to duck down, twist or move all the way around the mounted bumper to the back side of the stand in order to gain access to all surfaces for painting. The pivoting mechanism is engaged and actuated via a foot pedal connected to a cable. The pivoting mechanism is also connected to one end of a coil-over-shock mechanism/gas spring assembly, the other end of the coil-over-shock is connected to the Mast Assembly. Depressing the foot pedal causes the attached bumper to pivot forward to varying degrees, depending on the length the pedal is depressed.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
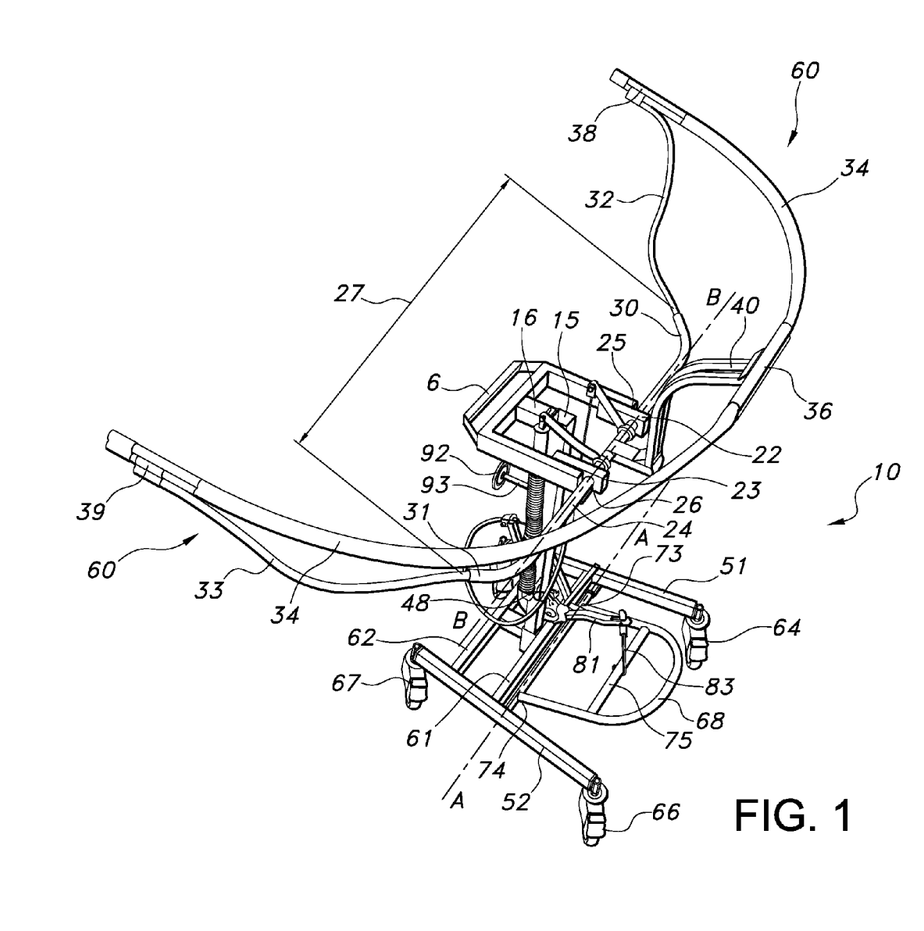
FIG. 1 is a perspective view of a mobile painting stand for vehicle bumpers constructed in accordance with the present invention.

Turning now to the drawings, FIG. 1 is a perspective view of a painting stand 10 constructed in accordance with the present invention. The painting stand 10 is designed to support a wide variety of vehicle body parts and accessories, for example, an automobile bumper 5 for spray painting said bumper. Except where noted in the following detailed description, painting stand 10 is preferably fabricated of rigid materials such as steel or other metal materials of equivalent rigidity.

The painting stand 10 comprises a base 11 supporting a vertically oriented main post 12 within which a vertical post extension 13 is telescopically supported to adjustably extend along a longitudinal axis. A hand wheel 92 supported at the end of a threaded rod 93 provided for adjusting the height of the post extension 13 with respect to the main post 12. As is known by those skilled in the art, one embodiment of this adjusting structure has the rod 93 received in a threaded opening in the main post 12 and in one of a plurality of openings (not shown) at spaced locations along the height of the post extension 13. Alternatively, a spring loaded ball (not shown) supported by the post extension is adjustably received in one of a plurality of openings or detents spaced along the length of the main post 12.

Figure 3:
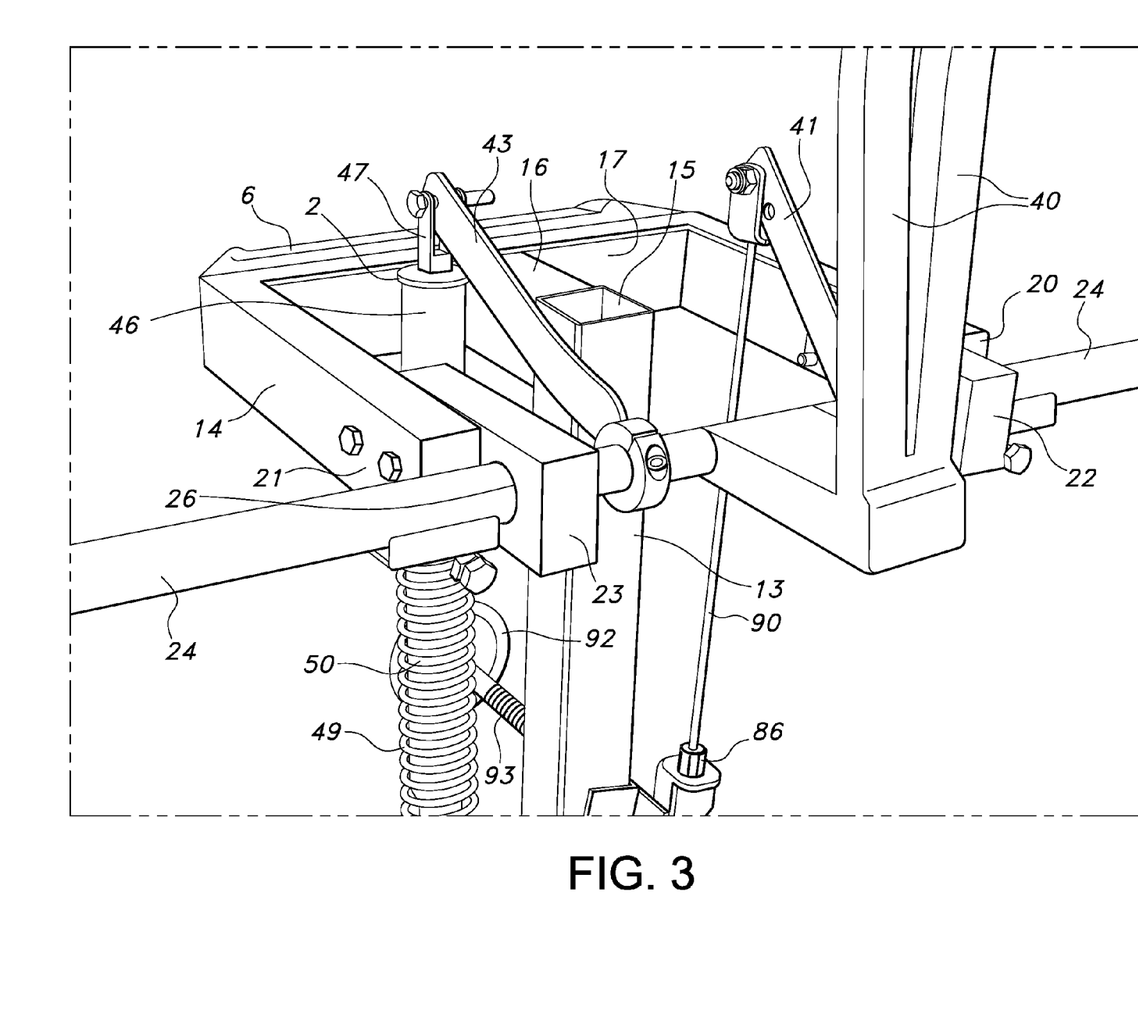
FIG. 3 is an enlarged partial perspective view of the upper vertical post extension and pivotal portion of the present invention painting stand for vehicle bumpers.

FIG. 3 is an enlarged partial perspective view of the upper vertical post extension 13 and the pivotal workings connected to a U-shaped horizontal bracket 14. The U-shaped horizontal bracket 14 is secured to the upper end 15 of the post extension 13 by conventional welding or its equivalent, or by other secure attachment means such as fasteners, and the like, if preferred. The U-shaped bracket has a handle 6 for moving the painting stand, which is attached to the outside of the U-shaped horizontal bracket 14 by conventional welding, machining or its equivalent. The U-shaped bracket 14 has a horizontal bar 16 attached to an inner side 17 thereof by conventional welding attachment or its equivalent. Alternatively, the U-shaped horizontal bracket 14 is joined to the horizontal bar 16 using other secure attachment means such as fasteners, and the like, if preferred.

Figure 2:
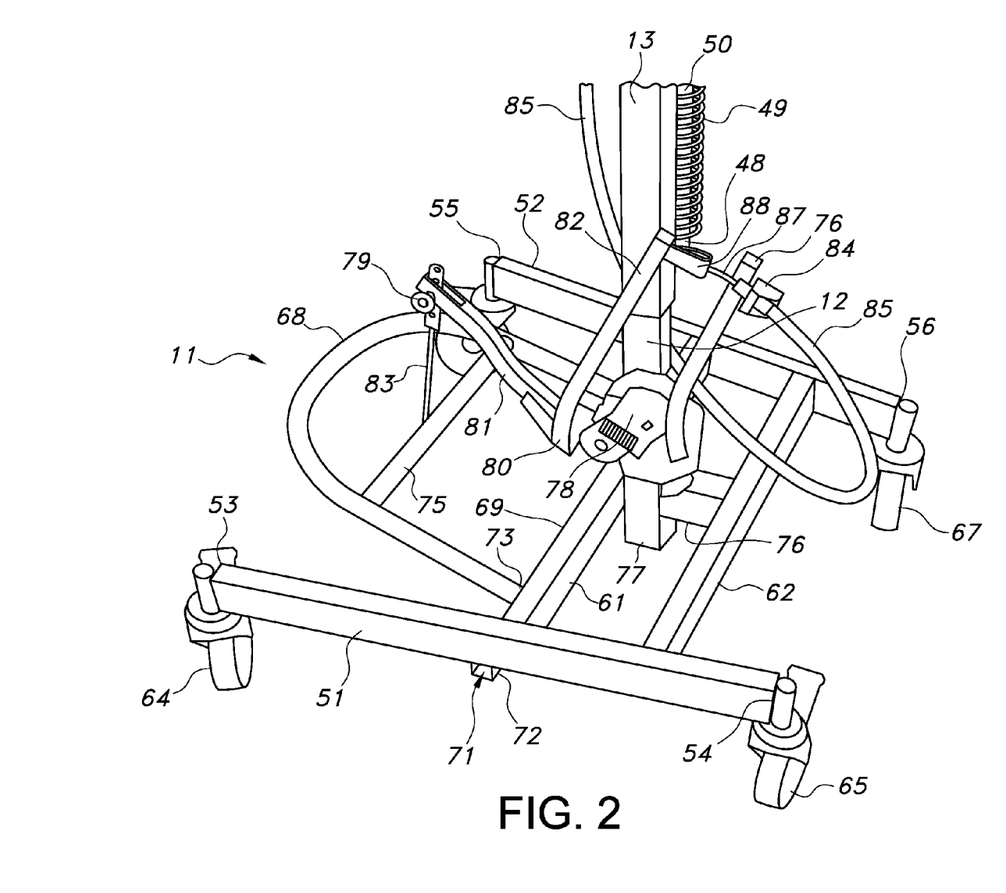
FIG. 2 is an enlarged partial perspective view of the base portion of the present invention painting stand for vehicle bumpers.

FIG. 2 is an enlarged partial perspective view of the base portion of the present invention painting stand 10. The base 11 is comprised of a right base bar 51 connected to a left base bar 52. The joining or attachment of the ends of these two base bars 51, 52, and of those base bars and cross bars yet to be discussed, may all be accomplished by conventional welding, its equivalent, or by using any other means or variation of secure attachments such as fasteners, clamps, crimped sleeves, and the like, if preferred. The right bar 51 extends from a right base bar proximal end 53 to a distal end 54. Similarly, the left base bar 52 extends from a left base bar proximal end 55 to a distal end 56.

The side-by-side right and left base bars 51, 52 are connected to each other by at least two crossbars 61 and 62. In particular, a first crossbar of a first length connects between the right and left base bars 51, 52. A second crossbar 62 of a second length also connects to the right and left base bars 51, 52. The first crossbar 61 is spaced proximally from the second crossbar 62. The first length of the first crossbar 61 is greater than the second length of the second crossbar 62. That way, the distal ends 54, 56 of the right and left base bars 51, 52 are closer to each other than their proximal ends 53, 55. This helps stabilize the painting stand 10 during use. Moreover, the first crossbar 61 connects to the first and second base bars 51, 52 preferably spaced distally past a mid-point along the lengths of the base bars 51, 52.

Selectively lockable caster-type wheels 64, 65, 66, 67, which are preferably of a conventional type that freely swivel in accordance with the direction of intended movement of the painting stand 10, are secured to the respective proximal and distal ends of the right and left base bars 51, 52. The caster wheels 64, 65, 66 and 67 provide the painting stand 10 of the present invention as a rollingly movable device.

Figure 7:
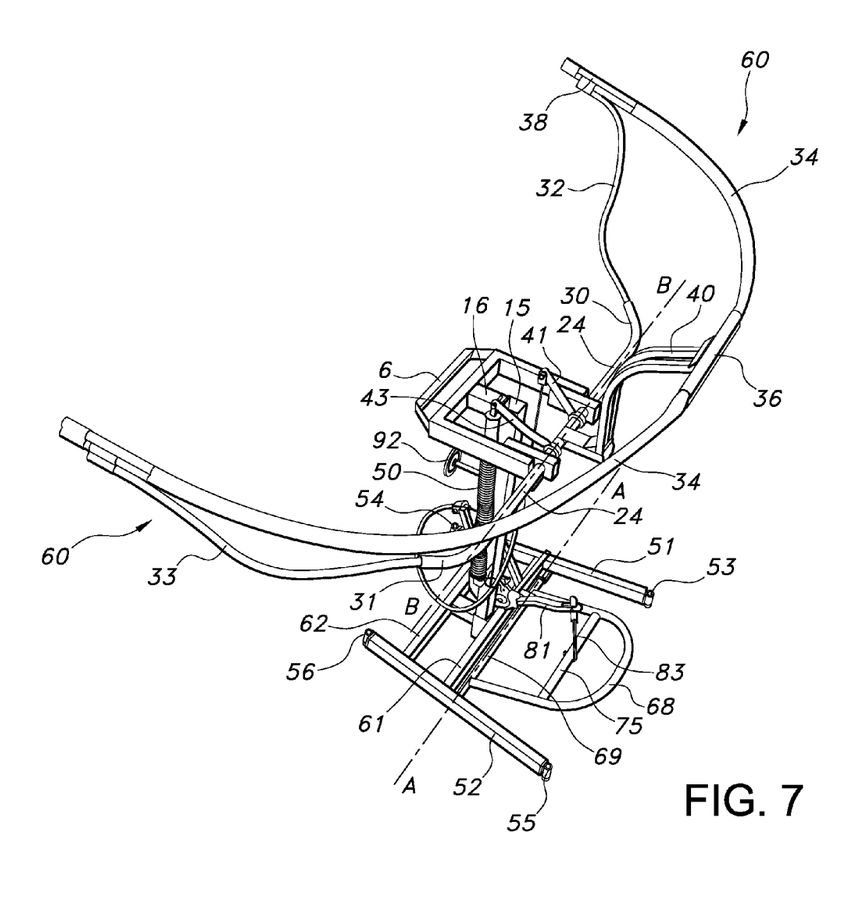
FIG. 7 is a perspective view of a stationary painting stand for vehicle bumpers constructed in accordance with the present invention.

Alternatively, as shown in FIG. 7, the caster wheels are not present and the painting stand 10 is a stationary device as a work station. In that case, the base bars are replaced by a floor plate (not shown) that is bolted or otherwise secured to a floor, and the like, to provide the painting stand 10 in a fixed work station location.

A U-shaped foot pedal 68 is rigidly connected to a third cross-bar 69 using a conventional weld attachment, and the like. Opposed ends of the third crossbar 69 are received in upwardly facing brackets 72 secured to the bottom of the right and left base bars 51, 52 using a conventional weld attachment, the like. That way, a downward force on the U-shaped foot pedal 68 causes the third crossbar 69 to pivot about a first axis A-A of rotation (FIGS. 1 and 7) in a downward direction toward the caster wheels 64 to 67 and a floor support surface. The third crossbar 69 is connected to the right and left base bars 51 and 52 at a location that is proximal, but adjacent to the first crossbar 61. The third crossbar 69 is about centered along the lengths of the base bars 51, 52. The U-shaped foot pedal 68 has its spaced apart ends 73, 74 connected to the third crossbar 69 adjacent to the right and left base bars 51, 52 using a conventional weld attachment, and the like. A stabilizer foot pedal bar 75 connects to opposite sides of the U-shaped foot pedal 68, spaced distally from the trough of the U-shape.

As shown in FIG. 2, a stabilizer base bar 76 is connected to a mid-point on the second crossbar 62 using a conventional weld attachment, and the like. The stabilizer base bar 76 is oriented perpendicularly to the second cross bar 62 and extends proximally to join to an upwardly facing open ended box bar 77. The box bar 77 is connected to the first crossbar, opposite the stabilizer base bar 76 using a conventional weld attachment, and the like. The main vertical post 12 is received in the upper open end of the box bar 76 and extends longitudinally upwardly therefrom.

A ratchet mechanism 78 is connected to the vertical main post 12 adjacent to the stabilizer bar 76 and the open ended box bar 77. The ratchet mechanism 78 includes a rigid yoke 80 comprising a forward and upwardly angled arm 81 rigidly connected by welding, and the like, to a rearward and upwardly extending arm 82. Alternatively, the forward and rearward arms 81, 82 are machined out of a single piece of rigid material. As those skilled in the art will readily appreciate, the ratchet mechanism 78 is of a conventional construction comprising a wheel with teeth into which a pawl drops or catches so as to prevent reversal of motion or convert reciprocating motion on the foot pedal 68 into stepped rotary motion about axis A-A of the third crossbar 69.

A rigid or semi-rigid member 83 connects from the forward arm 81 to the stabilizer bar 75 of the U-shaped foot pedal 68. A chain is an exemplary semi-rigid structure for member 83. FIG. 2 shows that the connection between member 83 and the forward arm 81 is adjustable with a pin 79 received in an opening provided at an upper end of the forward arm 81 and in one of several openings in an upper end of a rigid connection member 83.

A second rearward and upwardly extending arm 76 is secured to the base or main vertical post 12 adjacent to the ratchet mechanism 78 at a location that is spaced distally from the rearward and upwardly extending arm 82 of the yoke 80. A distally facing first conduit bracket 84 is connected to the second rearward and upwardly extending arm 76. The first conduit bracket 84 supports a flexible conduit 85 that leads to a second conduit bracket 86 connected to the post extension 13 in the telescopic relationship with the main vertical post 12 at a location that is part-way up its vertical length, preferably at or adjacent to the upper end of the main post extension 13.

A movable push/pull cable 87 resides in the flexible conduit 85. The push/pull cable 87 has a length that is greater than that of the flexible conduit 85. That way, one end or a lower end of the push/pull cable 87 connects to a cable bracket 88 connected to the rearward and upwardly extending arm 82 of the yoke 80 of the ratchet mechanism 78. An opposite end 90 of the flexible cable 87 leads out through the second conduit bracket 86 and extends in an upwardly direction approximately parallel to the axis of the main vertical post 12 and the telescopic post extension 13.

As shown in FIG. 3, the main U-shaped bracket 14 is joined to an upper end of the main post extension 13 by a connecting bar 16. The connecting bar 16 extends distally from the main post extension 13 to connect to the main U-shaped bracket 14. The connections of the U-shaped bracket 14 to the connection bar 16 and the connection bar to the main post extension 13 are made using conventional welding techniques, and the like. With the U-shaped bracket 14 facing proximally, the aligned ends of its spaced apart bracket legs 20, 21 are at a proximal location with respect to the longitudinal axis of the main post extension 13 telescopically received in the main vertical post 12.

The spaced apart bracket legs 20, 21 of the main U-shaped bracket 14 in turn support secondary legs 22, 23. The secondary legs 22, 23 are preferably made of ultra-high-molecular-weight (UHME) polyethylene, and like material, and extend proximally out past the aligned ends of the spaced apart bracket legs 20, 21. The UHMW polyethylene secondary legs 22, 23 are attached to the spaced apart bracket legs of the U-shaped bracket 20, 21 by bolting, clamping, gluing, or other fastener means well known to those skilled in the art. Ultra-high-molecular-weight (UHME) polyethylene is preferred to provide a measure of flexibility to the secondary legs 22, 23 during use of the painting stand 10.

A rotatable rod 24 comprising part of a support rack 60 is received in aligned openings 25, 26 of the secondary legs 22, 23. In this position, the rotatable rod 24 resides vertically spaced above the U-shaped foot pedal 68. A middle portion 27 of the rotatable rod 24 is an axial section that is generally horizontally oriented and aligned along a second axis B-B of rotation. However, spaced apart end portions 30 and 31 of the rotatable rod 24 deviate from axis B-B and are contoured in a shape that extends distally and somewhat upwardly. Further, the rotatable rod 24 is an open conduit that receives opposed secondary flexible cables 32 and 33 comprising the lower part of the support rack 60. The secondary flexible cables 32, 33 extend distally and upward so that their respective ends are spaced a significant distance distally and horizontally above the base 11 of the painting stand 10.

Figure 5:
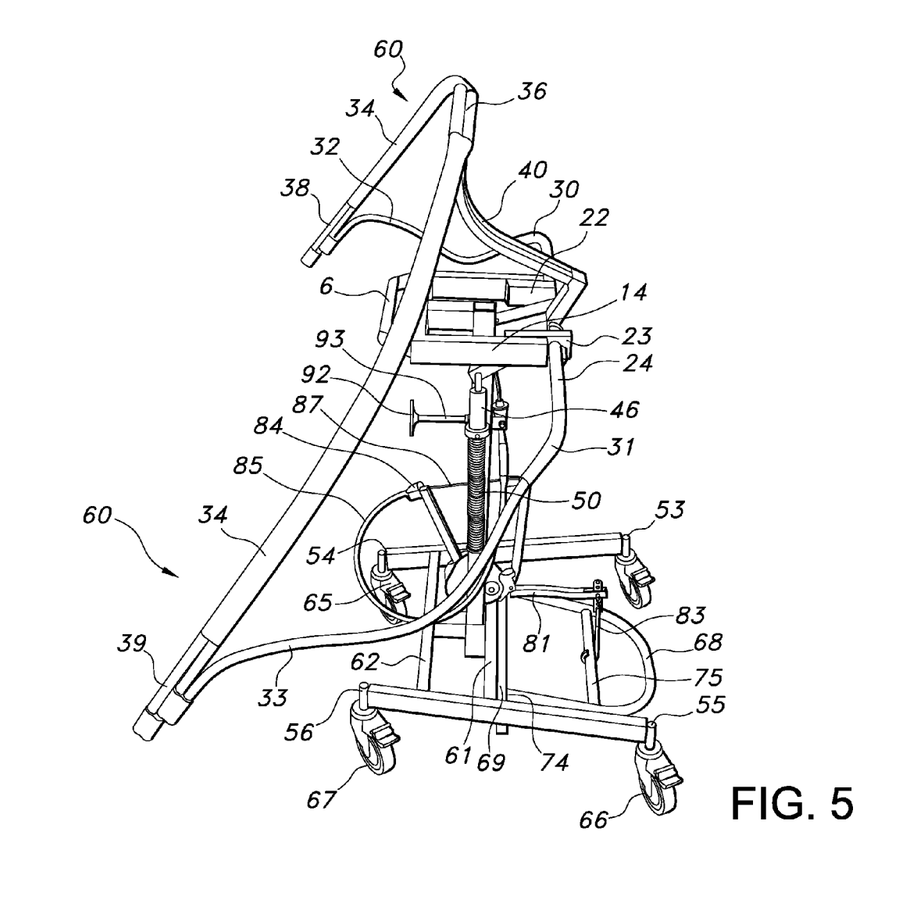
FIG. 5 is a perspective view of the present invention painting stand for vehicle bumpers with the support rack in an inverted tilted position.

As depicted in FIGS. 1, 5 and 7, a flexible main U-shaped support cable ("main support cable") 34 arcs in opposed right and left directions from a second horizontal open conduit 36 to opposed ends 38 and 39. The horizontal conduit 36 is aligned vertically above the opposed secondary flexible cables 32, 33 supported in the rotatable rod 24 and above the U-shaped foot pedal 68. The horizontal conduit 36 of the main support cable 34 is supported by an upwardly and proximally contoured bracket 40 that connects from the horizontal conduit 36 to the rotatable rod 24. Moreover, the opposed ends 38 and 39 of the main support cable 34 are connected to the ends of the opposed secondary flexible cables 32, 33 supported in the open conduit of the rotatable rod 24. These connections are by crimping, swaged sleeves, tape, welding, gluing, threaded fasteners, or any other conventional means readily known to those skilled in the art. That way, the support rack 60 comprises the rotatable rod 24 and the opposed secondary flexible cables 32, 33 connected to the main flexible main support cable 34. The flexible main U-shaped support cable 34 is made from plastic sheathed steel cabling, or some similar or like semi-rigid attributed material such as a plastic or polymer or some other moldable semi-rigid material.

Figure 4:
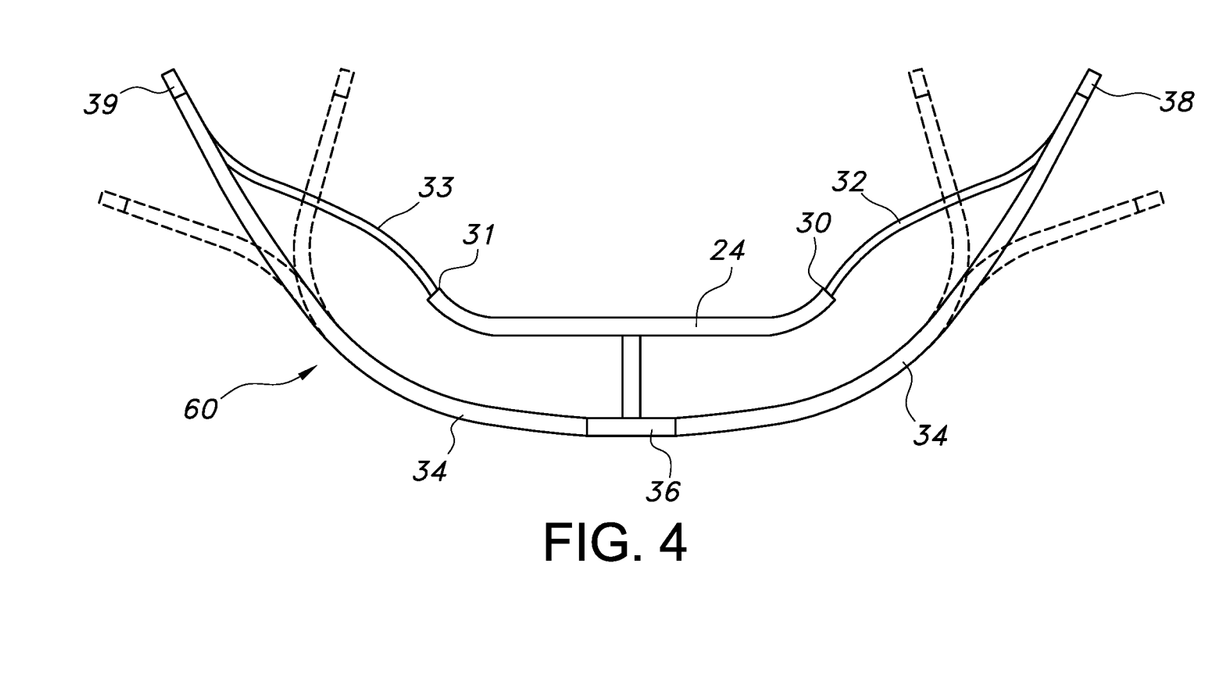
FIG. 4 is a top view of the support rack of the present invention painting stand for vehicle parts with a depiction of the support rack's ability to flex.

Aligning the horizontal conduit 36 and flexible main support cable 34 vertically above the opposed secondary flexible cables 32, 33 supported in the rotatable rod 24 enables a user to mount a workpiece, for example a vehicle bumper 5, on the main flexible U-shaped support cable 34 spaced vertically above the foot pedal 68. As shown in FIG. 4, which is a top view of the support rack 60 of the present invention, providing the main support cable 34 as a flexible member means that a bumper 5 of a size and shape of any vehicle make and model is readily supported on the flexible main support cable 34.

Figure 6:
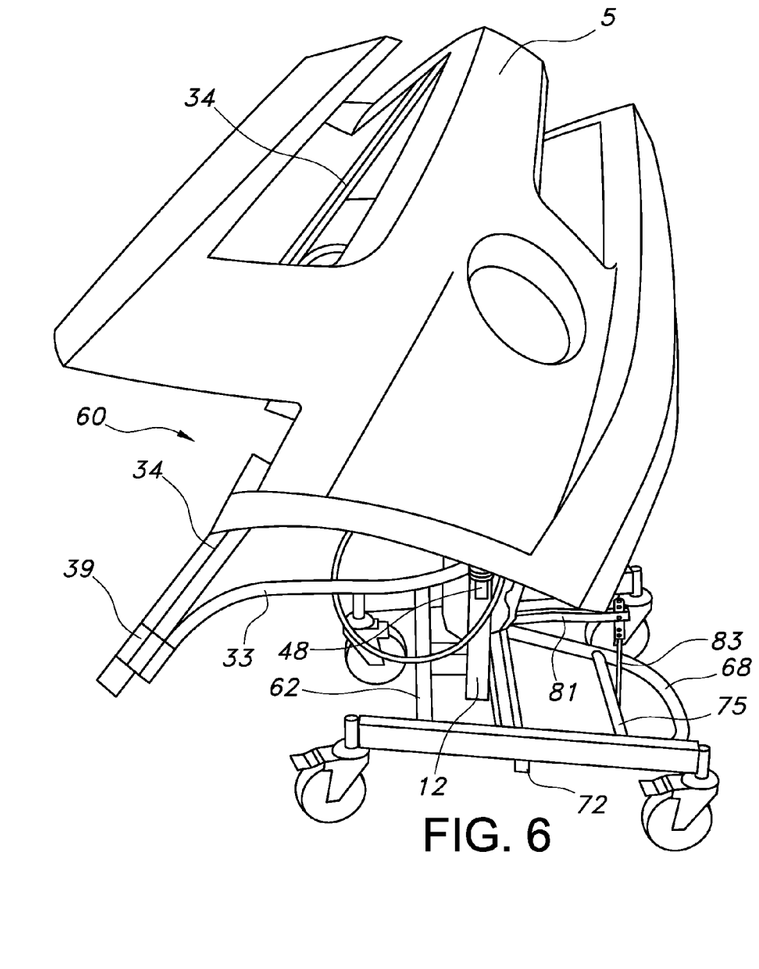
FIG. 6 is a perspective view of the present invention painting stand for vehicle bumpers supporting a typical bumper in an inverted tilted position.

As shown in FIG. 6, the main support cable 34 nests on the inside of the bumper 5 and conforms to the contoured shape of bumper 5 for maximum contact, support and ease of affixing the main support cable 34 to the bumper 5 with two zip ties, one at each end. While the drawings of FIGS. 1, 5, 6 and 7 depict the main flexible support cable 34 comprising two cables stacked one on top of the other and joined by crimping, swaged sleeves, tape, welding, gluing, threaded fasteners, or any other conventional means readily known to those skilled in the art, such as is merely by way of example. It is contemplated that the main flexible U-shaped support cable 34 can be a single cable of sufficient mass to support the vehicle bumper 5.

As shown in FIGS. 1, 3 and 7, the upper end 90 of the flexible push/pull cable 87 leading out through the second conduit bracket 86 and aligned approximately parallel to the longitudinal axis of the main and extension posts 12, 13 is adjustably connected to a rigid lever 41. The rigid lever 41 extends in a proximal direction to a connection point on the rotatable rod 24. A second lever 43 (FIG. 7) is connected to the rotatable rod 24 opposite the contoured bracket 40. A distal end of the second lever 43 is connected to the upper end 47 of a secondary vertically oriented shaft 46. A lower end 48 of the secondary shaft 46 is connected to the lower end of the main post 12. A coil spring 49 is supported on the secondary shaft 46. It should be noted that the secondary shaft 46 and coil spring 49 is preferably a coil-over-shock mechanism/gas spring assembly 50. An upper end of the coil spring 49 abuts a collar 2 affixed to the secondary shaft 46. That way, movement of the main support cable 34 supporting the vehicle bumper 5 is counterbalanced by the bias of the coil-over-shock mechanism/gas spring assembly 50.

In Use

FIG. 5 is a perspective view of the present invention painting stand for vehicle bumpers 10 with the support rack 60 in an inverted tilted position, and FIG. 6 is a perspective view of the present invention supporting a typical bumper 5 in an inverted tilted position. In use, a workpiece, for example the bumper 5 for an automobile as shown in FIG. 6 is supported on the main support cable 34 affixed to opposed secondary flexible cables 32, 33 connected to the main rod 24 supported by the main U-shaped bracket 14 connected to the extension post 13 telescopically supported in the main vertical post 12. As previously described, the main support cable 34 is a flexible member so that bumpers of various shapes and sizes readily fit onto the cable with its flexible ends nested to the curved opposed ends of the bumper 5. Then, the user stands facing the bumper 5 with his foot on the foot pedal 68. For example, the bumper 5 is first supported in a generally horizontal orientation so that the user can begin spray painting the bumper 5. Then, when it is desired to change the position of the bumper 5, the user pressed down on the pedal 68 with his foot. This causes the third crossbar 69 to pivotably rotate about axis A-A in a clockwise direction toward a floor support surface as viewed from a perspective of the left base bar 52 looking at the right base bar 51 in the distance as shown in FIGS. 1, 5, 6 and 7. The ratchet mechanism 78 prevents unintended reversal of this motion.

Clockwise rotation of the third crossbar 69 moves the rigid member or semi-rigid chain 83 connecting from the forward yoke arm 81 to the stabilizer bar 75 of the foot pedal 68 in a downwardly direction. As the forward yoke arm 81 moves downwardly, it causes the rearwardly extending yoke arm 82 to move forward, pulling on the movable push/pull cable 87 partially housed inside the flexible conduit 85. As the push/pull cable 87 moves through the conduit 85, its upper end 90 attached to the lever 41 connected to the main rotatable rod 24, causes the main rotatable rod 24 to rotate in a counterclockwise direction about axis B-B (FIGS. 1, 3, 5 and 7). This rotational movement of the main rod 24 is against the bias of the coil spring 46 supported on the secondary shaft 46 with the secondary shaft being connected to the rotatable rod 24 by the second lever 43. As the main rod 24 rotates, the connected U-shaped main flexible cable 34 and the secondary flexible cables 32, 33 connected to the main rod 24 by the main U-shaped bracket 14 rigidly connected to the extension post 13 also rotate. That way, the user can work on different surfaces of the bumper 5, for example while painting the bumper 5. The coil spring 49 serves to counterbalance the weight of the bumper 5 so that this movement is steady and well controlled.

After work on the bumper 5 is completed, the user releases the ratchet mechanism 78 by again pressing down on the pedal 68 with his foot, causing the ratchet mechanism 78 to release in a conventional manner, and thus allowing reversal of motion of the entire pivoting assembly. This causes the third crossbar 69 to pivotably rotate in a counterclockwise direction about axis A-A away from the floor support surface as viewed from a perspective of the left base bar 52 looking at the right base bar 51 in the distance as shown in FIGS. 1, 3, 5 and 7. The energy stored in the coil spring 49 serves to apply the reverse force necessary to then lift in a controlled manner the weight of the rotated bumper in FIG. 6 and counter-rotate the main rod 24 in a clockwise direction about axis B-B, urging the bumper and the entire bumper mount assembly support rack 60 back to its original horizontal position as shown in FIG. 1. The preferred coil-over-shock mechanism/gas spring assembly 50 counterbalances the weight of the bumper 5 so that this movement is steady and well controlled. The painted bumper 5 then is removed from the main flexible cable 34 of the painting stand 10 as a finished workpiece.

It is appreciated that various modifications to the inventive concepts described herein may be apparent to those of ordinary skill in the art without departing from the spirit and scope of the present invention as defined by the appended claims.

That which is claimed is:

1. A painting stand for supporting a vehicle bumper for spray painting, the painting stand comprising:
   a) a base;
   b) a foot pedal at or adjacent to a lower end of the vertical post, wherein the foot pedal is depressible about a first rotational axis;
   c) a vertical post supported by and extending upwardly along a first longitudinal axis from the base;
   d) a support rack connected at or adjacent to an upper end of the vertical post, wherein the support rack is configured to support the vehicle bumper and is rotatable about a second rotational axis that is perpendicular to the first longitudinal axis of the vertical post, the support rack comprising:
      i) a rotatable rod rotatably connected to the vertical post and extending along the second rotational axis, wherein the rotatable rod extends to opposed rotatable rod first and second ends connected to respective outwardly extending first and second secondary flexible cables, the first and second secondary flexible cables extending to spaced apart first and second secondary flexible cable distal ends;
      ii) a bracket rigidly connected to the rotatable rod intermediate the opposed first and second secondary flexible cables, wherein the bracket extends upwardly from the rotatable rod, spaced above the foot pedal;
      iii) a horizontal rod connected to a distal end of the bracket and extending along a third longitudinal axis that is parallel to the second rotational axis of the rotatable rod, wherein the horizontal rod extends to opposed horizontal rod first and second ends connected to respective outwardly extending first and second main flexible cables, the first and second main flexible cable extending to spaced apart first and second main flexible cable distal portions, iv) wherein the distal ends of the first and second secondary flexible cables are connected to the corresponding first and second main flexible cable distal portions, and v) wherein first and second secondary flexible cables connected to the first and second main flexible cables are configured to nest against an inner surface of a bumper to thereby support the bumper spaced above the base and the foot pedal; and e) a connecting structure connecting from the support rack to the foot pedal, f) wherein, with the support rack supporting a vehicle bumper in a first position, movement of the foot pedal about the first rotational axis in one of a clockwise or counterclockwise direction causes the support rack connected to the foot pedal by the connecting structure to rotate in the other of the clockwise or counterclockwise direction opposite that of the foot pedal to thereby move from the first position to a second position.

2. The painting stand of claim 1, wherein a coil spring connects from the support rack to the base and wherein the coil spring serves to bias movement of the support rack as the foot pedal is depressed to move the support rack from the first position to the second position and, as pressure on the foot pedal is relaxed, to move the support rack from the second position back to the first position.

3. The painting stand of claim 1, wherein a ratchet mechanism connects between the foot pedal and the connecting structure, the ratchet mechanism being configured to prevent unintended movement of the support rack from the second position back toward the first position.

4. The painting stand of claim 1, wherein an extension post is telescopically supported by the main vertical post so that a height of the support rack connected to the extension post is adjustable with respect to the main post and the base.

5. The painting stand of claim 1, wherein the connecting structure comprises a push/pull wire.

6. The painting stand of claim 1, wherein caster wheels are connected to the base so that the painting stand is movable.

7. The painting stand of claim 1, wherein the base is configured to be secured to a support surface in a fixed location.

8. The painting stand of claim 1, wherein the first rotational axis of the foot pedal is spaced closer to the vertical post than the second rotational axis of the support rack.

9. The painting stand of claim 1, wherein an imaginary plane bisecting the vertical post is aligned substantially parallel to the first and second axes of rotation, and wherein movement of the foot pedal about the first rotational axis in the one of the clockwise or counterclockwise direction to cause the support rack connected to the foot pedal by the connecting structure to rotate in the other of the clockwise or counterclockwise direction from the first position to the second position causes the support rack to rotate toward a second side of the imaginary plane opposite a first side of the imaginary plane on which the first and second axes of rotation reside.

10. A painting stand for supporting a vehicle bumper for spray painting, the painting stand comprising:

a) a base;

b) a foot pedal at or adjacent to a lower end of the vertical post, wherein the foot pedal is depressible about a first rotational axis;

c) a vertical post supported by and extending upwardly along a first longitudinal axis from the base;

d) a support rack connected at or adjacent to an upper end of the vertical post, wherein the support rack is configured to support the vehicle bumper and is rotatable about a second rotational axis that is perpendicular to the first longitudinal axis of the vertical post, the support rack comprising:

i) a rotatable rod rotatably connected to the vertical post and extending along the second rotational axis, wherein the rotatable rod extends to opposed rotatable rod first and second ends connected to respective outwardly extending first and second secondary flexible cables, the first and second secondary flexible cables extending to spaced apart first and second secondary flexible cable distal ends;

ii) a bracket rigidly connected to the rotatable rod intermediate the opposed first and second secondary flexible cables, wherein the bracket extends upwardly from the rotatable rod, spaced above the foot pedal;

iii) a horizontal rod connected to a distal end of the bracket and extending along a third longitudinal axis that is parallel to the second rotational axis of the rotatable rod, wherein the horizontal rod extends to opposed horizontal rod first and second ends connected to respective outwardly extending first and second main flexible cables, the first and second main flexible cable extending to spaced apart first and second main flexible cable distal portions having respective first and second main flexible cable distal ends, iv) wherein the distal ends of the first and second secondary flexible cables are connected to the corresponding first and second main flexible cable distal portions, and v) wherein first and second secondary flexible cables connected to the first and second main flexible cables are configured to nest against an inner surface of a bumper to thereby support the bumper spaced above the base and the foot pedal; and e) a connecting structure connecting from the support rack to the foot pedal, f) wherein, with the support rack supporting a vehicle bumper in a first position, movement of the foot pedal about the first rotational axis in one of a clockwise or counterclockwise direction causes the support rack connected to the foot pedal by the connecting structure to rotate in the other of the clockwise or counterclockwise direction opposite that of the foot pedal to thereby move from the first position to a second position.

11. The painting stand of claim 10, wherein a coil spring connects from the support rack to the base and wherein the coil spring serves to bias movement of the support rack as the foot pedal is depressed to move the support rack from the first position to the second position and, as pressure on the foot pedal is relaxed, to move the support rack from the second position back to the first position.

12. The painting stand of claim 10, wherein a ratchet mechanism connects between the foot pedal and the connecting structure, the ratchet mechanism being configured to prevent unintended movement of the support rack from the second position back toward the first position.

* * * * *